United States Patent [19]

Schumacher

[11] Patent Number: 6,153,250

[45] Date of Patent: Nov. 28, 2000

[54] CHITOSAN-STABILIZED PEANUT BUTTER AND METHOD OF PREPARATION

[76] Inventor: Edward W. Schumacher, 1863 N. "E" St., Aberdeen, Wash. 98520

[21] Appl. No.: 09/333,443

[22] Filed: Jun. 14, 1999

Related U.S. Application Data

[60] Provisional application No. 60/089,346, Jun. 15, 1998.

[51] Int. Cl.[7] ............................... A23L 1/056; A23L 1/38
[52] U.S. Cl. .......................... 426/633; 426/573; 426/654; 426/658
[58] Field of Search .................................... 426/633, 658, 426/573, 654

[56] References Cited

U.S. PATENT DOCUMENTS

| | | |
|---|---|---|
| 2,068,051 | 1/1937 | Canton . |
| 2,131,064 | 9/1938 | Musher . |
| 3,615,591 | 10/1971 | Newlin . |
| 4,034,121 | 7/1977 | Dunn et al. ............................. 426/333 |
| 4,223,023 | 9/1980 | Furda . |
| 4,832,977 | 5/1989 | Avera . |
| 4,942,055 | 7/1990 | Avera . |
| 5,591,477 | 1/1997 | Boyce . |

FOREIGN PATENT DOCUMENTS

| | | |
|---|---|---|
| 671151 | 9/1963 | Canada . |
| 36-7338 | 2/1959 | Japan . |

OTHER PUBLICATIONS

Hennen, William, Chitosan, Woodland Publishing, Inc., Pleasant Grove, Utah (1996), p. 1–31.

*Primary Examiner*—Helen Pratt
*Attorney, Agent, or Firm*—Brian J. Coyne

[57] ABSTRACT

A natural peanut butter blend gravitationally stabilized with chitosan to prevent separation of the oil and proteinaceous phases. The blend is prepared by adding chitosan and a fatty acid, preferably stearic acid, to the oil phase, blending the oil and proteinaceous phases, and then adding water until the blend noticeably thickens.

12 Claims, No Drawings

CHITOSAN-STABILIZED PEANUT BUTTER AND METHOD OF PREPARATION

CROSS REFERENCE TO RELATED APPLICATIONS

Applicant filed a Provisional Application on Jun. 15, 1998, application Ser. No. 60/089,346, concerning related subject matter.

BACKGROUND OF THE INVENTION

1. Field of the Invention

The invention relates generally to gravitationally stabilized peanut butter, and methods for preparing the same. More particularly, the invention relates to the use of chitosan to stabilize the oily and proteinaceous phases of peanut butter.

2. Background Art

In the manufacture of peanut butter, peanuts are first removed from the outer shells, then separated from the inner hulls. The peanut kernels are then roasted at a controlled temperature and moisture removed. The roasted peanuts are thereafter ground to a paste, the paste commonly being referred to as natural peanut butter. Such natural peanut butter is not stable: on standing, the natural peanut butter separates into a clear layer of peanut oil that gradually collects on top of a proteinaceous layer. Many consumers object to natural peanut butter for this reason, since they find it inconvenient to have to mix the peanut oil into the proteinaceous layer each time they wish to consume the peanut butter. Natural peanut butter also lacks the spreadability desired by consumers.

A stabilizing technique employed in the prior art to overcome this oil separation problem has been addition of hydrogenated peanut, soybean, cottonseed, rapeseed and/or palm oil, after the peanuts are ground, with thorough mixing. See, for example, U.S. Pat. No. 5,591,477, to Boyce, et al. This would set into a firm consistency matrix that entrapped the peanut butter. Musher, U.S. Pat. No. 2,131,064 disclosed a food base material that may be incorporated into peanut butter to maintain the peanut oil in suspension. The food base material comprised a heavy aqueous paste containing water-absorbent bodier and thickeners, such as pectin, and a relatively hard fat material. These stabilization techniques are subject to the objection, however, that ingestion of highly hydrogenated fats is widely regarded as presenting unacceptable risks to human health.

What is needed, therefore, and what the present invention provides, is a method to manufacture natural peanut butter that overcomes the oil separation problem and that is free from these objections. This is accomplished by mixing into the oil phase of natural peanut butter a quantity of chitosan and an edible fatty acid, blending the oil and proteinaceous phases with stirring, and adding water with stirring, as described below. Chitosan has been previously used as a food additive and in pharmaceutical preparations to reduce the absorption of lipids; see, for example, U.S. Pat. No. 4,223,023 to I. Furda. See generally, Hennen, William H., Ph.D., *Chitosan*, Woodland Publishing, Inc. (Pleasant Grove, Utah, 1996).

The use of chitosan to gravitationally stabilize peanut butter appears to be new, however.

SUMMARY OF THE INVENTION

In a first aspect of the invention, a method is provided for gravitationally stabilizing natural peanut butter. To the upper, oil phase of a quantity of natural peanut butter is added, with mixing, a quantity of chitosan and an edible fatty acid. The oil phase is blended with the proteinaceous phase and a quantity of water is added to the blend, thereby gravitationally stabilizing the peanut butter such that the oil and proteinaceous phases will not separate even after prolonged standing. Preferably, chitosan is added to a final concentration of 0.5–3.0%, by weight; more preferably, 0.7–2.0%, by weight; and most preferably 0.75–1.25%, by weight. Preferably, the edible fatty acid is chosen from one or more of oleic, linoleic, palmitic, stearic or linolenic acid. Preferably, the edible fatty acid is added to a final concentration of 0.1–0.6%, by weight; more preferably, 0.1–0.4%, by weight; and most preferably, 0.14–0.25%, by weight. Most preferably, the edible fatty acid is stearic acid. Preferably, the water is added to a final concentration of 0.2–2.0% by weight, and most preferably, about 0.5% by weight. In a second aspect of the invention, a gravitationally stabilized natural peanut butter is provided, prepared according to the described method.

DETAILED DESCRIPTION OF THE PREFERRED EMBODIMENT

If the starting material is the peanuts themselves, natural peanut butter may be prepared by the methods well known to persons of ordinary skill in the art, comprising the steps of removing the outer shells from the peanuts; separating the peanut kernels from the inner hulls of the peanuts; roasting the peanut kernels, thereby removing moisture therefrom; and grinding the roasted peanut kernels, thereby forming a natural peanut butter paste. Alternatively, the starting material for the method of the present invention may be any of a variety of commercially available natural peanut butters, prepared substantially according to the above-recited steps.

Natural peanut butter is allowed to stand for a sufficient period of time, preferably at room temperature (about 20° C.), for the oil phase to separate from, and form a liquid layer on top of, the proteinaceous phase of the peanut butter. Typically, when the phases are fully separated, the oil phase will comprise about one-half of the entire volume of the peanut butter. Chitosan is added to the oil phase, and the oil phase is stirred. Similarly, an edible fatty acid is added to the oil phase, and the oil phase is stirred. The fatty acid is an edible straight or branched chain fatty acid, preferably oleic, linoleic, palmitic, stearic or linolenic acid, and most preferably stearic acid. The oil phase and the proteinaceous phase are then mixed and blended together, and water is added until the mix noticeably thickens. It is suggested, without being bound, that the presence of the fatty acid and water in the mix convert the chitosan from a free amino form to a protonated-amine, cationic form of chitosan and that the latter is more effective in achieving gravitational stabilization of the mix.

The chitosan used is in powder form, and is most preferably made from the exoskeleton of shrimp, and treated to remove any trace of shrimp flavor by methods well known to persons of ordinary skill in the art. Chitosan is preferably added to a final concentration in the mix of 0.5–3.0%, by weight; more preferably, 0.7–2.0%, by weight; and most preferably 0.75–1.25%, by weight. The fatty acid is added to the mix to a preferable final concentration of 0.1–0.6%, by weight; more preferably, 0.1–0.4%, by weight; and most preferably, 0.14–0.25%, by weight. The amount of water that should be added will vary somewhat, depending upon the moisture content of the natural peanut butter starting material; generally, water should be added to final concentration of the added water in the amount 0.2–2.0%, by weight, and most preferably to about 0.4%, by weight.

The following example is given by way of illustration and not limitation:

Three pounds (6.6 kg.) of Golden Boy All Natural Peanut Butter, prepared by Golden Peanut Co., Atlanta, Ga., was permitted to stand until there was complete separation of the oil and proteinaceous phases. To the oil phase was added 75 g. of chitosan derived from shrimp exoskeleton. The oil phase was stirred. To the oil phase was then added 23 g. of powdered, stearic acid. The oil phase was again stirred. The oil phase was mixed into, and blended with, the proteinaceous phase for about two minutes, using a kitchen blender. Thirty milliliters (30 g.) cf water was then added to the blended mix, with stirring. The blended natural peanut butter/chitosan mix was observed to thicken noticeably with addition of the water. Thereafter, the oil and proteinaceous phases remained fully in suspension and did not separate. No taste of shrimp was detectable upon taste testing of the peanut butter.

Various changes and modifications will become obvious to those skilled in the art. It is the intent that these changes and modifications are to be encompassed within the spirit of the appended claims and that the invention described herein is illustrative only and not intended to limit the scope of the invention.

I claim:

1. A method for gravitationally stabilizing peanut butter, comprising:
    (a) allowing the peanut butter to stand for sufficient time for an oil phase to separate out from, and form on top of, a proteinaceous phase;
    (b) adding chitosan to the oil phase;
    (c) adding an edible fatty acid to the oil phase;
    (d) stirring the oil phase;
    (e) mixing and blending the oil phase with the proteinaceous phase to form a peanut butter/chitosan/fatty acid blend; and
    (f) adding water, with stirring, to said blend until noticeable thickening of said blend occurs.

2. The method of claim 1, wherein the final concentration of the chitosan is 0.5–3.0%, by weight.

3. The method of claim 2, wherein the edible fatty acid is selected from one or more of oleic, linoleic, palmitic, stearic and linolenic acid.

4. The method of claim 3, wherein the final concentration of the edible fatty acid is 0.1–0.4%, by weight.

5. The method of claim 3, wherein the final concentration of the added water is 0.2–2.0%, by weight.

6. The method of claim 1, wherein the final concentration of chitosan is 0.75–1.25%, and the fatty acid is stearic acid in final concentration 0.14–0.25%, by weight.

7. The method of claim 6, wherein the added water is in final concentration about 0.4%, by weight.

8. A gravitationally stabilized, natural peanut butter blend, comprising an admixture of chitosan, a fatty acid selected from one or more of oleic, linoleic, palmitic, stearic and linolenic acid, water, and natural peanut butter.

9. The gravitationally stabilized, natural peanut butter blend of claim 8, wherein the chitosan is present in final concentration 0.5–3.0%, by weight, the fatty acid is stearic acid in final concentration 0.1–0.6%, by weight, and water is present in final concentration 0.2–2.0%, by weight.

10. A gravitationally stabilized, natural peanut butter blend made from natural peanut butter by a method, comprising:
    (a) allowing the peanut butter to stand for sufficient time for an oil phase to separate out from, and form on top of, a proteinaceous phase;
    (b) adding chitosan to the oil phase;
    (c) adding an edible fatty acid to the oil phase;
    (d) stirring the oil phase;
    (e) mixing and blending the oil phase with the proteinaceous phase to form a peanut butter/chitosan/fatty acid blend; and
    (f) adding water, with stirring, to said blend until noticeable thickening of said blend occurs.

11. The gravitationally stabilized peanut butter blend of claim 10, wherein the chitosan is present in final concentration 0.5–3.0%, by weight, the fatty acid is stearic acid in final concentration 0.1–0.6%, by weight, and water is present in final concentration 0.2–2.0%, by weight.

12. The gravitationally stabilized peanut butter blend of claim 10, wherein the chitosan is present in final concentration 0.75–1.25%, by weight, the edible fatty acid stearic acid present in final concentration 0.14–0.25%, by weight, and the added water is present in final concentration of about 0.4%, by weight.

* * * * *